United States Patent [19]

Tsuyama

[11] Patent Number: 4,642,606
[45] Date of Patent: Feb. 10, 1987

[54] DATA DISPLAY UNIT FOR A BICYCLE
[75] Inventor: Sadaharu Tsuyama, Osaka, Japan
[73] Assignee: Tsuyama Mfg. Co., Ltd., Japan
[21] Appl. No.: 692,930
[22] Filed: Jan. 18, 1985
[30] Foreign Application Priority Data
  Jan. 20, 1984 [JP] Japan .................. 59-6736[U]
[51] Int. Cl.⁴ .............. G01P 3/48; G01P 3/54; B62J 3/00; B62J 6/00
[52] U.S. Cl. .................... 340/134; 324/174
[58] Field of Search ........... 340/793, 134, 756; 324/160, 161, 166, 173, 174, 115, 99 D, 99 R

[56] References Cited
U.S. PATENT DOCUMENTS
3,585,629 6/1971 Baynard .................. 340/793
4,352,063 9/1982 Jones ..................... 324/174
FOREIGN PATENT DOCUMENTS
0561982 6/1977 U.S.S.R. ................ 340/793

Primary Examiner—Gerard R. Strecker
Assistant Examiner—Jose M. Solis
Attorney, Agent, or Firm—Allegretti, Newitt, Witcoff & McAndrews, Ltd.

[57] ABSTRACT

A running data display unit (1) for a bicycle calculates running data such as running speed, running distance, average speed, maximum speed etc. of a bicycle, based on pulse signals from a revolution detecting portion (3). This calculation is performed by a microcomputer incorporated in the display unit. The running data obtained by the calculation are displayed in a digital form on a liquid crystal display panel (15). The panel (15) gives display of a speed unit km/h or mile/h selectively. This display of km/h (or mile/h) emits a winking light when the microcomputer measures determined running data such as the running distance, the average speed etc. and emits uninterrupted light when measuring of such running data is stopped. As a result, the rider of the bicycle can immediately ascertain whether measuring operation is being made or not.

10 Claims, 8 Drawing Figures

DATA DISPLAY UNIT FOR A BICYCLE

BACKGROUND OF THE INVENTION

1. Field of the Invention

The present invention relates to a data display unit mounted on a bicycle by which running data such as the running speed, the running time, the running distance etc. of a bicycle are calculated and displayed.

Particularly, the present invention relates to an improvement in the manner of display in a data display unit for a bicycle in which a microcomputer is incorporated to process the input data supplied from a sensor so that determined data such as the running speed etc. may be displayed.

2. Description of the Prior Art

A data display unit for a bicycle for making display of running data such as the running speed, the running distance and the like generally comprises a revolution detecting sensor for detecting the number of revolutions of a wheel and a main body of the display unit for calculating the running speed, the running distance and the like based on a signal from the revolution detecting sensor.

A revolution detecting sensor in general was, in the past, connected to a main body of a display unit by a release wire and the like so that a rotating block provided in the sensor may be mechanically rotated directly by the wheels. However, recently, in order that load may not be applied to a driving system of a bicycle and that the the number of revolutions may be detected more accurately, a so-called magnet sensor or a photoelectronic sensor has been utilized as a revolution detecting sensor.

In the U.S. Pat. No. 4,074,196 for example, it is disclosed that a sensor comprising a photoelectronic sensor, a magnetic sensor or a Hall device can be utilized as a revolution detecting sensor. The U.S. Pat. No. 4,156,190 discloses an example of a photosensor as a revolution detecting sensor. These revolution detecting sensors are attached in association with the wheels.

A main body of a display unit having close relation with the present invention is disclosed for example in the U.S. Pat. No. 4,007,419 which comprises a calculating the running speed, the running distance and the like based on a revolution signal provided from a revolution detecting sensor and also comprises liquid crystal display for indicating the running speed, the running distance and the like. Such a main body of a data display unit is mounted on a desired position near the handle or any other suitable position where the rider of the bicycle can easily see the display.

In such a conventional data display unit for a bicycle as described above, the running distance and other data to be displayed are generally not calculated at all times and selection can be made for stop of the calculation or for start of the calculation. In this case, if the running distance for example is displayed in a conventional data display unit, it is only by the incrementation in the display of the running distance that the rider of the bicycle can ascertain whether the running distance displayed is the data being calculated or the data in the stop state of calculation.

However, if the bicycle runs slowly, incrementation in the display of the data display unit is made very slowly (for example, incrementation in the display is not made till the bicycle runs for 10 m in case the display data changes for every 10 m) and accordingly, such a conventional display unit has a disadvantage that the rider of the bicycle cannot immediately know whether the running distance is being calculated or not. In addition, when the bicycle is stopped, he cannot know whether the running distance is being calculated or not since the data of the running distance is not incremented. If data other than the running distance, for example, the total distance or the present time is selectively displayed, he cannot either know whether the running distance is being calculated or not since the running distance is not displayed.

SUMMARY OF THE INVENTION

It is a primary object of the present invention to provide a data display unit for a bicycle in which an improvement is made in the manners of display so that it can be immediately ascertained whether the desired data displayed is being calculated or not.

Briefly stated, the present invention comprises a running data display unit for a bicycle, comprising speed unit display winking means responsive to the output of running data calculation start/stop selecting means so that a speed unit indication in liquid crystal display means emits winking light when running data is being calculated and it stops winking and emits light continually when calculation of running data is stopped.

The present invention makes it possible to provide a display unit so conveniently designed that the rider of the bicycle can immediately know whether the data is being calculated or not according to the luminescent state of the speed unit indication given at all times.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
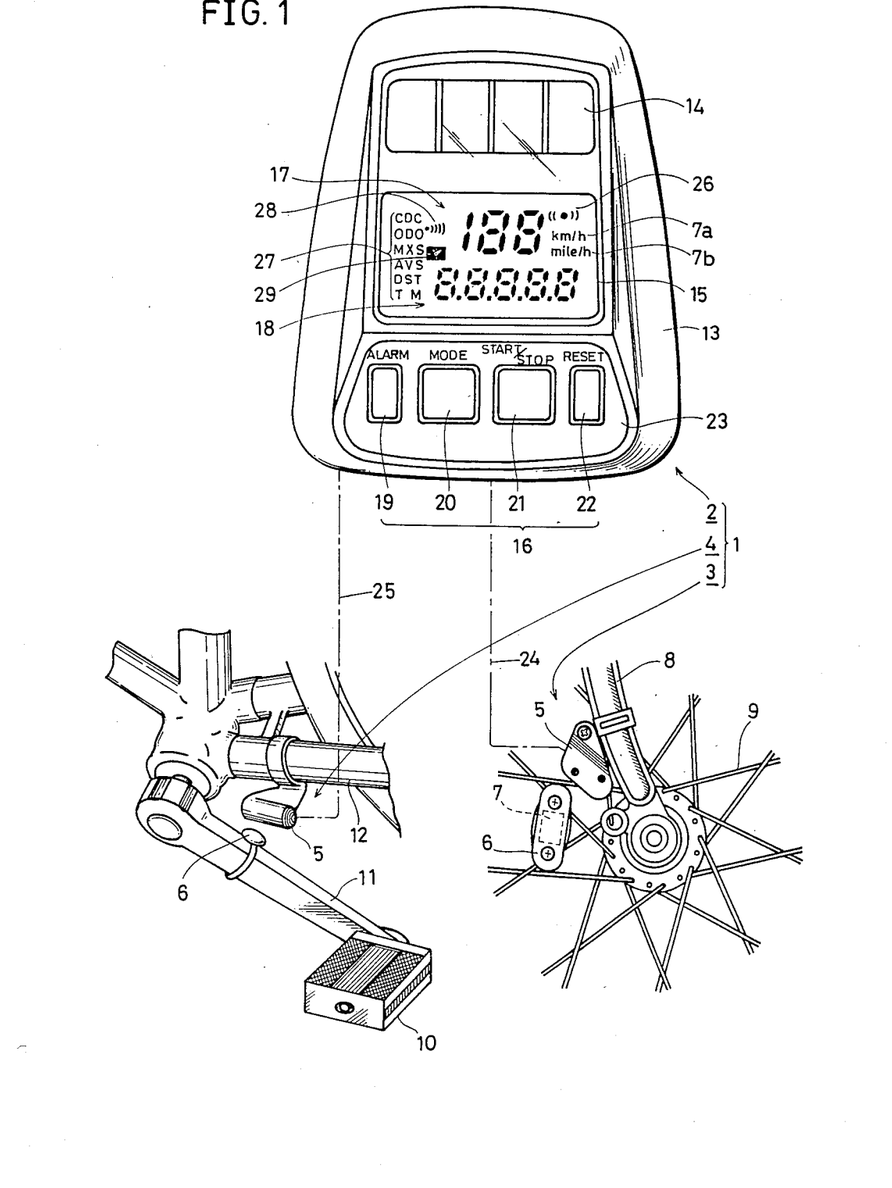
FIG. 1 is an appearance view of an embodiment of the present invention, showing a plan view of a main body of a display unit and revolution detecting sensors placed in determined positions of a bicycle. Connection of the main body of the display unit with the respective sensors is shown in a simplified manner by chained lines.

FIG. 1 is an appearance view of a preferred embodiment of the present invention. A data display unit 1 for a bicycle in this embodiment comprises a main body 2, a first revolution detecting portion 3 and a second revolution detecting portion 4. The first revolution detecting portion 3 detects the running speed, the running distance and other data of the bicycle. The second revolution detecting portion 4 detects the number of revolutions of a pedal.

The revolution detecting portions 3 and 4 are so-called magnet sensors each comprising a sensor 5 and a magnet base 6. A sensor 5 contains a lead switch not shown and a magnet base 6 contains a permanent magnet 7 for example as shown by a dotted line.

The sensor 5 of the first revolution detecting portion 3 is fixed for example at the top of a fork 8 supporting a front wheel of a bicycle and the magnet base 6 thereof is fixed in a front wheel spoke 9 related to the position of the sensor 5. For each revolution of the front wheel, the magnet base 6 passes by the sensor 5 and as a result, the lead switch contained in the sensor 5 turns on or off so that the sensor 5 provides a pulse signal to the main body 2.

The second revolution detecting portion 4 is provided for example in a crank 11 of a pedal 10 and a chain stay 12. More specifically, the sensor 5 thereof is fixed in the chain stay 12 and the magnet base 6 thereof is fixed in the crank 11. Each time the magnet base 6 passes by the sensor 5 by revolution of the pedal 10, the sensor 5 supplies a pulse signal to the main frame 2.

The main body 2, the first revolution detecting portion 3 and the second revolution detecting portion 4 are electrically connected by means of connecting cords 24 and 25 shown in a simplified manner by chained liens.

The first revolution detecting portion 3 is connected to the main body 2 by the connecting cord 24 in a state attached to a coupling bracket (not shown) mounted on a desired portion near the handle of the bicycle, while the second revolution detecting portion 4 is connected to the main body with another connecting means in a detachable manner. For example, a jack (not shown) is provided in the main body 2 and a plug (not shown) provided at the top of the connecting cord 25 from the second revolution detecting portion 4 is inserted into the jack so that the second revolution detecting portion 4 is connected to the main body 2. Accordingly, if it is not needed to calculate and display the number of revolutions of the pedal in the main body 2, the second revolution detecting portion 4 can be removed from the main body 2.

In this embodiment, the first revolution detecting portion 3 is placed in association with the front wheel. However, this portion 3 may be placed in association with the back wheel. Although the above described first revolution detecting portion 3 includes one magnet base 6, two or more than two magnets bases 6 may be utilized so that detecting accuracy of the detecting speed, the detecting distance etc. may be elevated. In such a case, the number of pulse signals provided from the sensor 5 for one revolution of the wheel is also increased according to the number of magnet bases 6.

The revolution detecting portions 3 and 4 may be structured by other detecting devices. For example, these portions 3 and 4 may be structured by photosensors or photoelectronic sensors or the like for providing pulse signals according to the change in the light transmission and interception.

The main body 2 has an appearance in which a solar battery 14, a liquid crystal display panel 15 and an operation key group 16 are disposed on the top surface of a housing 13.

The solar battery 14 receives sunlight and the like on the surface thereof and converts the light into electric current. The electric current obtained by conversion by the solar battery 14 is utilized for charging of a silver oxide battery to be described afterwards or for operation of the display unit.

On the liquid crystal display panel 15, running data such as the running speed as well as time data and other data are displayed in two rows. More specifically, in the upper row 17 of the display panel 15, the running speed is displayed at all times and in the lower row 18, data such as the running distance, the maximum speed and the like are selectively displayed.

On the right side of the upper row 17 of the display panel 15, a "pulse mark" 26 winking in response to a pulse signal supplied from the first revolution detecting portion 3 to the main body 2 and a speed unit "km/h" or "mile/h" are selectively displayed.

On the left side of the display panel 15, a mode mark 27 representing the kind of the data displayed in the lower row 18 is displayed. On the right side, an "alarm mark" 28 indicating alarm setting and a "time mark" 29 indicating the time are to be displayed.

The operation key group 16 serves to select data to be displayed in the lower row 18 of the display panel 15 or to enter a measuring operation start signal in the display unit 1. The operation key group 16 comprises, in the order from the left to the right in FIG. 1, an alarm key 19 for selection of setting and resetting of alarm, a mode key 20 for selection of data to be displayed in the lower row 18 of the display panel 15, a measurement key 21 for start and stop of measurement and a reset key 22 for resetting determined data out of the data to be displayed in the lower row 18 of the display panel 15. The surface 23 of the operation key group 16 has a relatively larger inclination angle than that of the surface of the solar battery 14 or the display panel 15 so that the respective keys 19 to 22 can be easily pressed.

The main body 2 has the above described appearance and in the housing 13, a microcomputer is incorporated. The microcomputer, controls display of determined data in the liquid crystal display panel 15 and makes other control operation, based on the signals entered from the first revolution detecting portion 3, the second revolution detecting portion 4 and the switches 19 to 22 of the operation key group 16.

In this embodiment, the detecting portions connected to the main body 2 are, as described above, the first revolution detecting portion 3 for detecting the number of revolutions of the wheel and the detachable second revolution detecting portion 4 for detecting the number of revolutions of the pedal. However, other detecting portions may be connected thereto as required.

Figure 2:
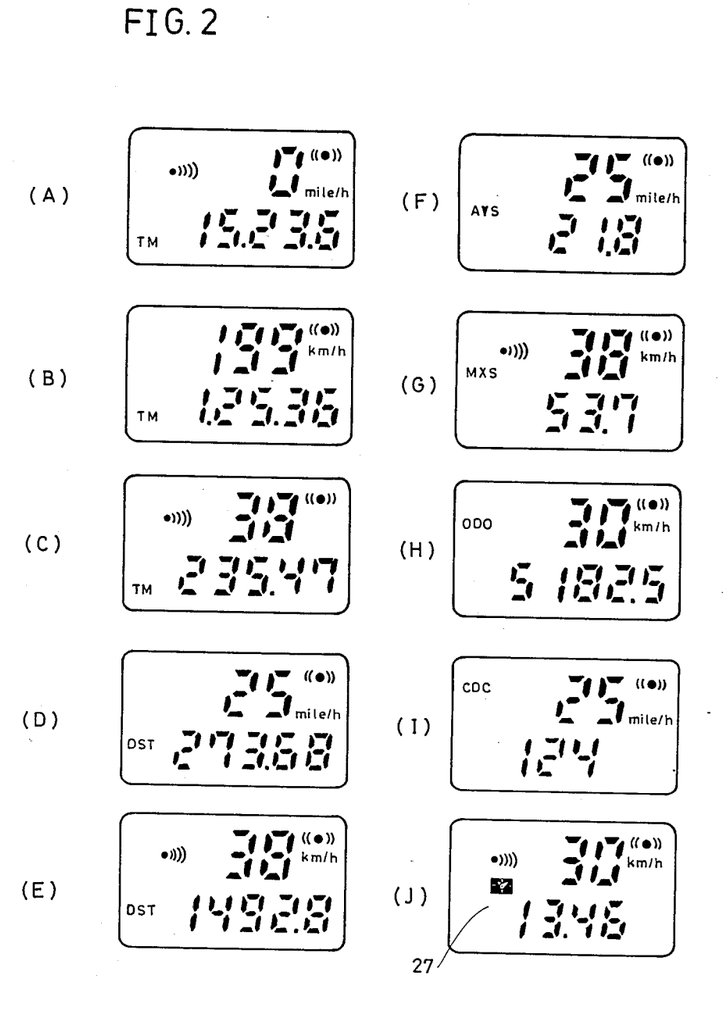
FIG. 2 shows examples of display on a display unit.

FIG. 2 shows various examples of display in the liquid crystal display panel 15. Referring to FIGS. 1 and 2, the manners of display of data will be described.

The liquid crystal display panel 15 is, as described above, structured such that number data are digitally displayed in the upper row 17 and in the lower row 18, respectively. In the upper row 17 of the display panel 15, the running speed of the bicycle is displayed at all times. For this display, numerals from "0" as shown in FIG. 2(A) to "199" at maximum as shown in FIG. 2(B) can be represented. In the lower row 18 of the display panel 15, various running data are selectively displayed. The display mode of the data displayed is indicated on the left side of the display panel 15. When the mode key 20 is pressed for a predetermined number of times to select the running time display mode, "TM" representing the running time display mode is displayed and the running time is digitally displayed in the lower row 18 as shown in FIGS. 2(A) to 2(C). The running time displayed is represented, in the case not attaining one hour, in a range from 0.1 second at minimum to 59 minutes 59.9 seconds at maximum as shown in FIG. 2(A). For example, the running time shown in FIG. 2(A) is 15 minutes 23.6 seconds. When the running time attains one hour, the manner of display changes automatically and in the case of one hour to 10 hours, a range up to 9 hours 59 minutes 59 seconds regarding one second as the minimum unit can be represented as shown in FIG. 2(B). For example, the running time shown in FIG. 2(B) is one hour 25 minutes 36 seconds. When the running time attains ten hours, the manner of display changes automatically and a range up to 999 hours 59 minutes regarding one minute as the minimum unit can be represented as shown in FIG. 2(C). For example, the running time shown in FIG. 2(C) is 235 hours 47 minutes.

When the mode key 20 is pressed once in the state of the running time display mode "TM", the display mode is selected to be the running distance display mode and the mode indication 27 becomes "DST". Then, the running distance in a period from the start of measurement to the present time is displayed in the lower row 18. This display is given in five figures including three figures to the left of the decimal point and two figures to the right thereof in the case not attaining 1,000 km (or miles) as shown in FIG. 2(D). If the running distance attains 1,000 km (or miles), the manner of display changes automatically and the display is made in five figures in total including four figures to the left of the decimal point and one figure to the right thereof.

Accordingly, if the running distance is a relatively short distance not attaining 1000 km (or miles), it is convenient for the rider of the bicycle to ascertain precise data of the running distance down to two figures of decimals. If the running data attains 100 km (or miles), the figures to the left of the decimal point increases automatically and accordingly a relatively long distance can be displayed.

When the mode key 20 is further pressed once, the display mode is selected to be the average speed display mode and the mode indication 27 shows "AVS". In the average speed display mode, the average speed in a period from the start of measurement to the present time is calculated and displayed as shown in FIG. 2(F). This average speed displayed is renewed for each second.

When the mode key 20 is pressed once more, the display mode is selected to be the maximum speed display mode as shown in FIG. 2(G) and the mode indication 27 shows "MXS". In this maximum speed display mode, an instantaneous maximum speed recorded during the period from the start of measurement to the present time is displayed. The instantaneous maximum speed is stored in a memory of the microcomputer to be described later. The instantaneous maximum speed is renewed and stored whenever the speed is increased.

When the mode key 20 is further pressed once, the display mode is selected to be the total distance display mode and the mode indication 27 becomes "ODO" as shown in FIG. 2(H). The total distance displayed in this total distance display mode is the total running distance detected by the data display unit 1 irrespectively of the start or stop of measurement. This display is made in the form of four figures to the left of the decimal point and one figure to the right thereof. When the total distance attains 10,000 km (or miles), the display returns to 0 to continually indicate the total distance. The content of this display is cleared when the power source of the data display unit 1 is removed.

When the mode key 20 is further preseed once, the cadence display mode is selected as the display mode and the mode indication 27 shows "CDC" as shown in FIG. 2(I). In the cadence display mode, the number of revolutions per minute of the pedal is indicated. Input for this display is detected by the second revolution detecting portion 4. In this embodiment, if the second revolution detecting portion 4 is detached from the main body 2, this cadence display mode "CDC" is skipped without being indicated.

If the mode key 20 is continually pressed for more than two seconds in any one of the above described modes, the display mode is selected to be the time display mode and as shown in FIG. 2(J), the present time is displayed in the lower row 18 and the time mark 27 emits winking light. This time display is given as a display for 24 hours by regarding one minute as the minimum display unit. The intervals of light emission of the time mark 29 correspond to the intervals of one second.

As described above, using the mode key 20, data to be displayed in the lower row 18 of the display panel 15 is selected and the display mode of the data is represented by the mode indication 27. More specifically, each time the mode key 20 is pressed, the display mode is changed in the order of "running time"→"running distance"→"average speed"→"maximum speed"→"total distance"→("cadence"→) "running time". When the mode key 20 is pressed continually for more than 2 seconds, the display mode is changed to be the "time display mode" in which the time is displayed.

Using the measurement key 21 out of the operation key group 16, measurement of the running time, the running distance and the average speed is simultaneously started or stopped.

A distinctive feature of this embodiment is that the speed unit indication of km/h (or mile/h) is made to emit winking light for the purpose of indicating that the measurement is being made as a result of pressing the measurement key 21. This emitting winking light is made at, for example, one second intervals. More specifically, during the measurement, a change from the state in which the speed unit indication of km/h emits light as shown in FIG. 2(B) to the state in which the speed unit indication is extinguished as shown in FIG. 2(C) at about 0.5 second interval and vice versa occur periodically. As a result, the rider of the bicycle can immediately ascertain by seeing winking or uninterrupted light emission of the this speed unit indication of km/h (or mile/h), whether the running time, the running distance and the average speed are being measured or not.

Lighting or extinction of the alarm mark 28 as shown in FIGS. 2(A) or 2(C) is selected by means of the alarm key 19. By lighting of the alarm mark 28, the rider of the bicycle can ascertain that the alarm function is in an operating state. When the alarm mark 28 is lit, the alarm function (electric beeper) is able to beep. If not lit, it is not able to beep. Therefore, the cyclist can select "with sound" or "without sound".

Figure 3:
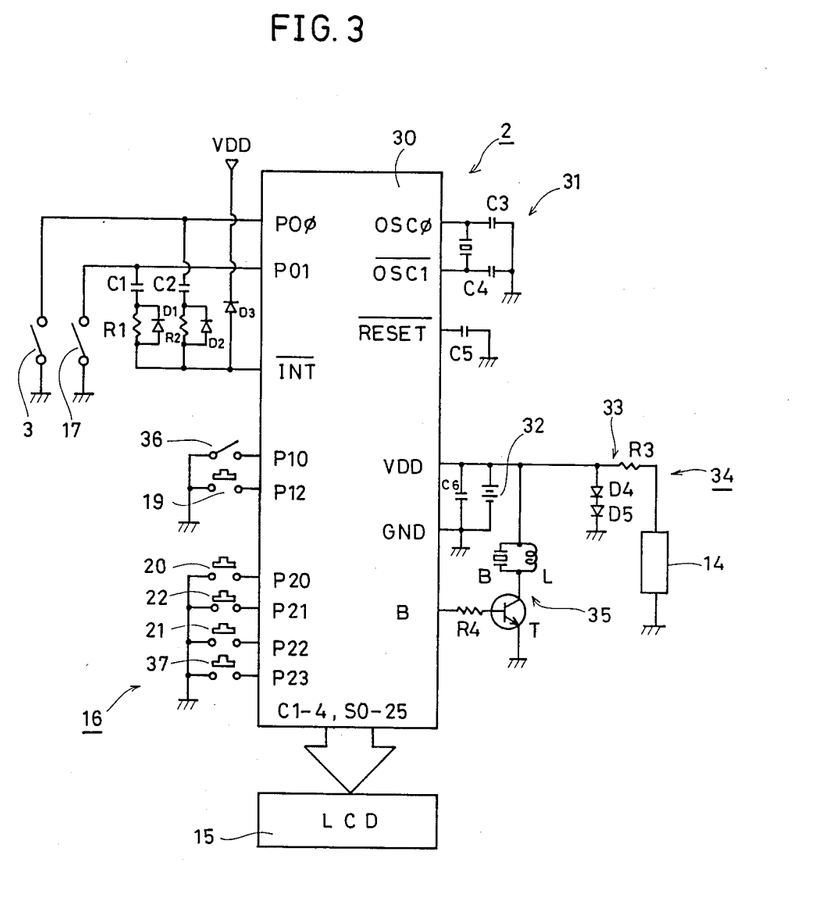
FIG. 3 is a block diagram showing a circuit structure of an embodiment of the present invention.

FIG. 3 is a block diagram showing a circuit structure of the main body 2 of this embodiment.

Referring to FIGS. 1 and 3, in the housing 13 of the main body 2, a microcomputer 30 is incorporated. The microcomputer 30 is structured by one large scale integration (LSI) chip for example, comprising a central processing unit (CPU) not shown and a random access memory (RAM) not shown. The circuit of the main body 2 comprises the microcomputer 30 as the center and also comprises a quartz crystal oscillator 31, a silver oxide battery 32, a constant voltage circuit 33 and a power supply circuit 34 including a solar battery 14. An alarm circuit 35, an operation key group 16 and a liquid crystal display panel 15 are further connected to the circuit of the main body 2.

The quartz crystal oscillator 31 serves to supply predetermined operation cycle clock pulse to the microcomputer 30. In response to the operation cycle clock pulse supplied from the quarts crystal oscillator 31, the microcomputer 30 performs control operation for each step and counts the time or makes other operation.

Electric power for operating the microcomputer 30 is supplied normally from the silver oxide battery 32. This silver oxide battery 32 is connected with the solar battery 14 through the constant voltage circuit 33.

As the solar battery 14, an amorphous silicon solar battery for example may be employed. In this embodiment, an amorphous silicon solar battery 14 having photoelectric conversion efficiency of more than 1% and effective power generation area of 0.0003 m$^2$ is employed. By this solar battery 14, energy of 39 J can be obtained a day based on the calculation regarding an average amount of sunlight per day as 13 MJ/m$^2$.

Average energy consumed per day by the microcomputer 30 is 7.8 J. Accordingly, consumption of the energy supplied from the silver oxide battery 32 to the microcomputer 30 can be sufficiently made up for by application of energy from the solar battery 14 in this embodiment. In addition, electric current from the solar battery 14 may be supplied directly to the microcomputer 30 as power source.

The constant voltage circuit 33 connected between the solar battery 14 and the silver oxide battery 32 serves to keep charging voltage constant when the silver oxide battery 32 is charged with electric current obtained by photoelectric conversion by the solar battery 14. For this reason, the constant voltage circuit 33 is structured by a circuit of two light emitting diodes D4 and D5 grounded the cathode side, connected in parallel with a resistor R3 and solar battery 14 in series connected.

In this case, the upper limit of the charging voltage for each cell of the silver oxide battery 32 is approximately 1.7 to 1.8 V. In this embodiment, the silver oxide battery 32 includes two cells connected in series. In consequence, in order to make the upper limit of the voltage applied from the solar battery 14 be lower than the upper limit of the charging voltage of the silver oxide battery 32, two light emitting diodes D4 and D5 are connected in series.

Figure 4:
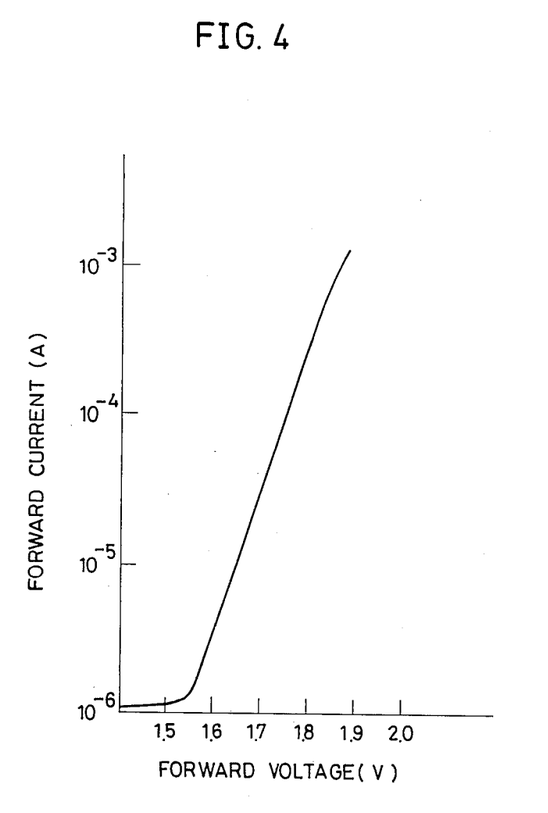
FIG. 4 is a graph showing characteristics of a light emitting diode in relation to forward voltage and forward current.

The forward direction voltage and current characteristics of the light emitting diodes D4 and D5 are for example as shown in FIG. 4. As can be seen from FIG. 4 representing the forward direction characteristics of the light emitting diodes D4 and D5, when the voltage applied in the forward direction becomes approximately 1.56 V or more, the diodes are conducted and forward current flows in proportion to the forward voltage. Thus, if light emitting diodes having suitable forward direction characteristics are employed, such light emitting diodes can be operated as constant voltage diodes for control of the upper limit of the charging voltage of one silver oxide cell.

The alarm circuit 35 generates a predetermined alarm sound when the transistor turns on by the output from the B terminal of the microcomputer 30.

Among the operation key group 16, the keys denoted by the reference numerals 19 to 22 are the keys described in connection with FIG. 1.

The switch denoted by the reference numeral 36 is an internal switch provided within the main body 2. By this internal switch 36 selection is made to enable the microcomputer 30 to calculate and display the cadence based on the pulse signals provided from the second revolution detecting portion 4 or to skip the above stated calculation and display. This internal switch 36 in this embodiment operates to make selection dependently on whether the second revolution detecting portion 4 is connected to the main body 2 or not.

The set key denoted by the reference numeral 37 is a key provided on the back surface of the main body 2, which serves to change the data to be entered in the microcomputer 30. By turning on the set key 37, data such as the size of the wheels of the bicycle, the unit of speed indication, the present time, the set speed or set distance for the alarms, etc. can be changed.

FIGS. 5A to 5D are flow charts for explaining operation procedures of the microcomputer 30 shown in FIG. 3. Referring to FIGS. 5A to 5D successively and also referring to FIGS. 1 to 3 as required, the operation of the data display unit 1 for a bicycle in this embodiment will be described.

Figure 5A:
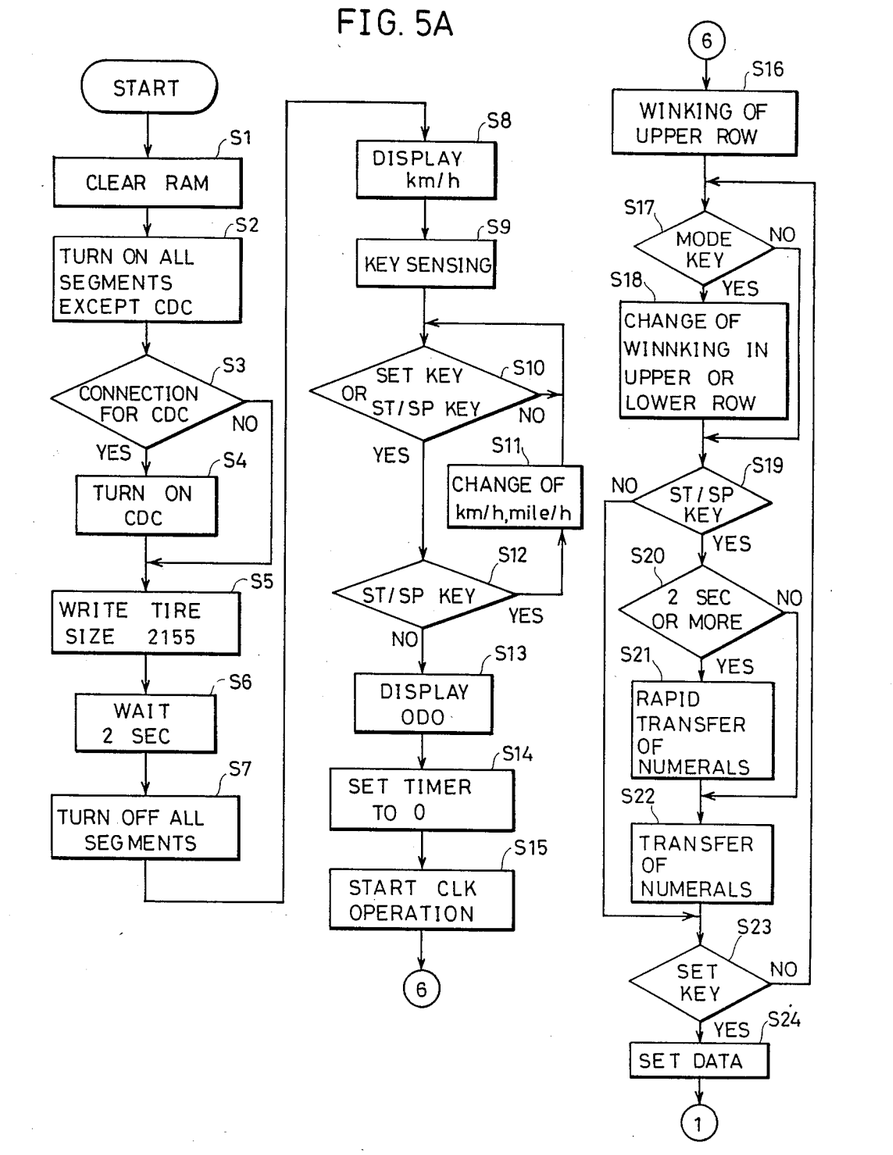
FIGS. 5A to 5D are flow charts showing control operation of an embodiment of the present invention.

When the silver oxide battery 32 serving as power source is attached in the main frame 2 of the unit 1, operation is started and the data stored in the RAM in the microcomputer 30 is cleared by initialization (in step S1).

Then, control operation in steps S2 to S8 as described below is performed automatically. The microcomputer 30 determines by the ON state or OFF state of the internal switch 36 whether the second revolution detecting portion 4 for calculation of cadence is connected to the main body 2 or not. If the second revolution detecting portion 4 is connected thereto, all the characters and marks of the liquid crystal display panel 15 are lighted up. If the second revolution detecting portion 4 is not connected, all the characters and marks except the mark "CDC" representing the cadence display mode are lighted up (in steps S2 to S4).

Subsequently, the tire size of the bicycle, namely, the outer circumference length of the tire of the bicycle is stored in the RAM of the microcomputer 30 as "2155" mm for example (in step S5).

All the characters and marks of the display lighted up in steps S2 to S4 continue to be displayed for two seconds (in step S6) and all the characters and marks except the speed unit indication km/h are turned off (in steps S7 and S8).

The microcomputer 30 is in waiting for operation of any one of the keys of the operation key group 16 (in step S9). When it is determined that the measurement key 21 is operated, the speed unit indication is changed from km/h to mile/h. This speed unit indication is changed alternately for each operation of the measurement key 21.

When it is determined by the microcomputer 30 that the set key 37 provided on the back surface of the main frame 2 is pressed, the mark "ODO" is indicated in the liquid crystal display panel 15 and the microcomputer 30 sets the timer to 0 and starts clock operation based on the operation cycle clock pulse provided from the quartz crystal oscillator 31. Thus, the time is counted (in steps S13 to S15).

Figure 5B:
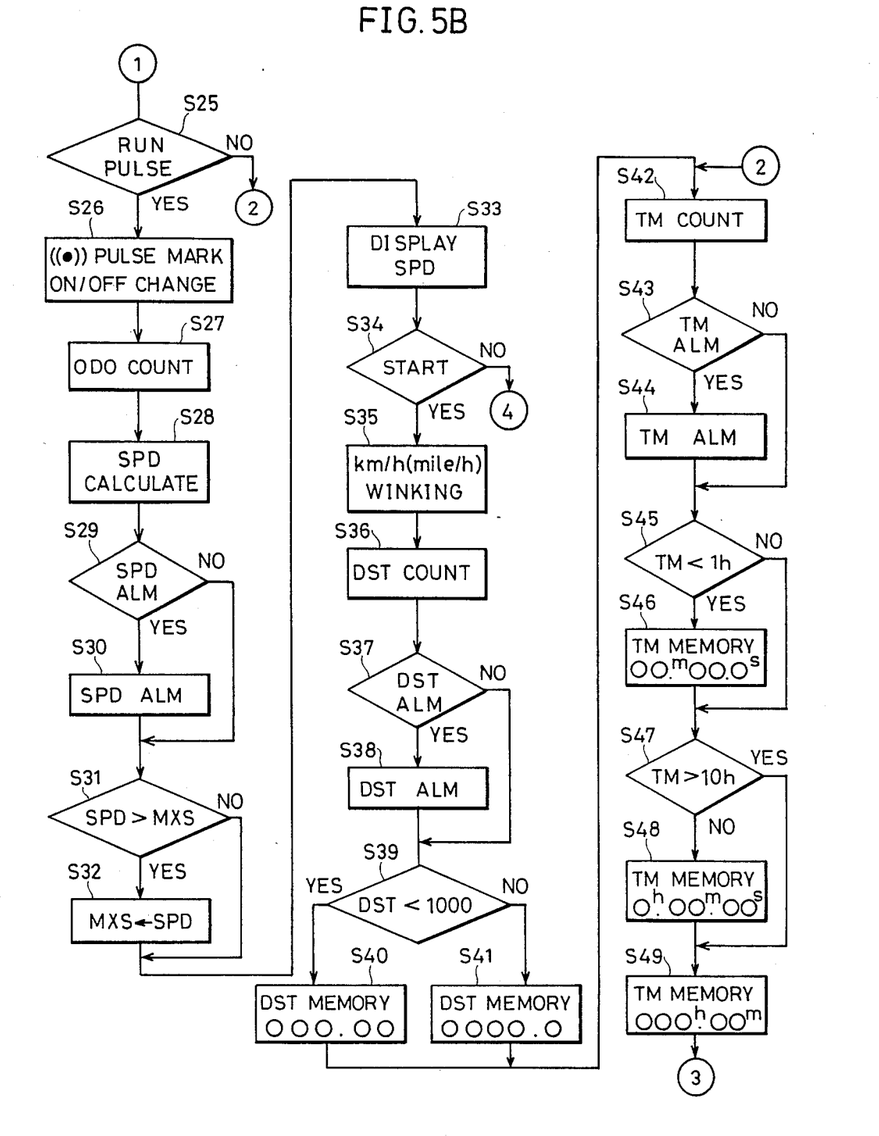

In this state, the microcomputer 30 gives a display of the tire size "2155" in the lower row 18 of the liquid crystal display panel 15 and makes the upper figures "21" emit winking light (in step S16). Then, by the operation of the mode key 20, the microcomputer 30 selects alternately winking of the upper two figures and that of the lower two figures of the display (in step S18). The microcomputer 30 determines whether the measurement key 21 is pressed or not, and as to the upper two figures or lower two figures emitting winking light according to the operation of the measurement key 21, it makes transfer of numerals in succession in a range from "00" to "99". At this time, if it is determined that the measurement key 21 is continually pressed for more than two seconds, the transfer of numerals is made rapidly and if not, numerals are transferred one by one each time the measurement key 21 is pressed once. When the set key 37 is pressed in this state, the numerals displayed are set as the determined data (in steps S23 and S24). In this case, the displayed data represents the tire size, which is set by pressing the set key 37.

When a bicycle provided with the data display unit 1 in this embodiment is made to run, RUN pulses are supplied from the first revolution detecting portion 3 to the main body 2. When the microcomputer 30 detects the RUN pulse, selection is made to turn on and off the pulse mark 26 at the rise of the pulse (in step S26) so that the pulse mark 26 emits winking light. Accordingly, the rider of the bicycle can ascertain by the winking of the pulse mark 26 that pulses are constantly supplied from the revolution detecting portion 3 to the main body 2 and that the data display unit 1 operates normally.

By the microcomputer 30, the total distance is calculated based on the RUN pulses applied thereto, and the time is measured and the running speed is calculated based on the operation cycle clock pulse from the quartz crystal oscillator 31 (in step S28). If the speed alarm is set, the alarm circuit 35 is operated to generate alarm sound when the calculated running speed exceeds the set speed for the alarm (in steps S29 and S30).

The microcomputer 30 stores an instantaneous maximum speed in the RAM as the maximum speed and when the running speed newly calculated exceeds the stored maximum speed, rewriting is made to store this newly calculated running speed as the maximum speed (in steps S31 and S32). The running speed is displayed in the upper row 17 of the liquid crystal display panel 15 (in step S33).

As described above, when the power source is turned on in the main body 2, the data display unit 1 for a bicycle in this embodiment calculates all the time the running speed and the total distance based on the detection signal from the revolution detecting portion 3 and displays all the time the running speed in the upper row 17 of the liquid crystal display panel 15. In the lower row 18 of the panel 15, the total distance is displayed in the total distance mode "ODO".

Figure 5C:
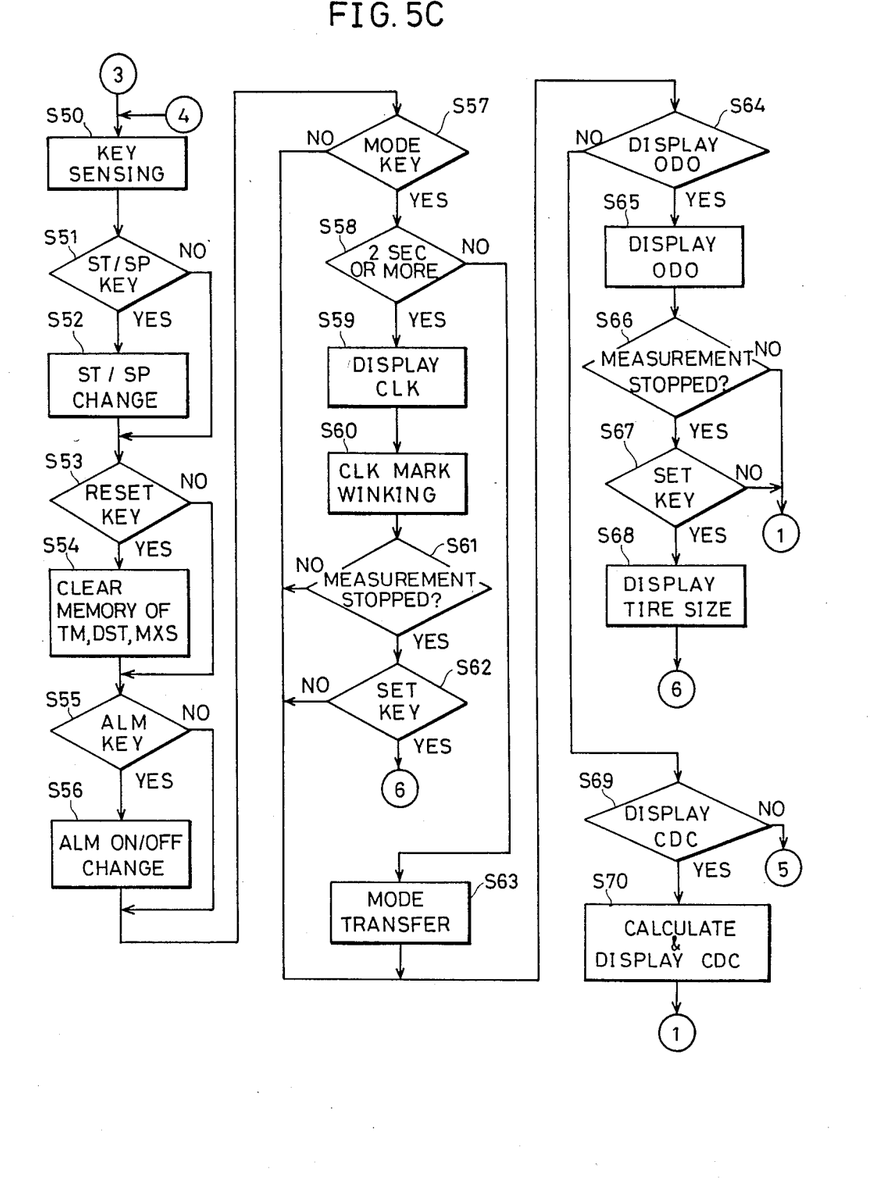

In step S34, the measurement key 21 is pressed and when the microcomputer 30 determines that measurement is started, the microcomputer 30 performs operations in the subsequent steps S35 to S52 so that the distance in the period concerned (the running distance) and the running time are measured. In this case, in step S35, the microcomputer 30 displays with winking light the speed unit indication "km/h" or "mile/h" in the liquid crystal display panel 15 so as to indicate that measuring operation is being made. The rider of the bicycle can ascertain that the running distance and the running time are being measured by seeing the winking light emission of the speed unit indication.

If the running distance being measured does not attain 1,000 km/h (or miles/h), the microcomputer 30 stores the running distance in a running distance storage area in the RAM as numeric data including upper three figures and lower two figures with respect to the decimal point. If the running distance exceeds 1,000 km/h (or miles/h), the running distance is stored in the above mentioned running distance storage area of the RAM as numeric data including upper four figures and lower one figure with respect to the decimal point (in steps S36, S40 and S41). Thus, the manner of storage changes dependent on whether the running distance exceeds a predetermined distance or not. Accordingly, the manner of display in the lower row 18 of the liquid crystal display panel 15 also changes according to the distance.

During the measuring operation, the microcomputer 30 measures the running time (in step S42) and changes the manner of storage of data in the running time storage area of the RAM as indicated in steps S45 to S49 so that the manner of display of the running time can be changed according to the time measured.

The microcomputer 30 compares, during the measuring operation, the running distance being measured and the running distance set by the running distance alarm and also compares the running time being measured and the time set by the running time alarm. If the measured running distance attains the set distance or if the measured running time attains the set time, the alarm circuit 35 produces alarm sound and subsequently, the alarm circuit 35 produces alarm sound at interval of the set distance or the set time (in steps S37 and S38 and steps S43 and S44).

The alarm sound at this time may be emitted differently according to the kind of the alarm by changing for example the tone of the sound or the intervals at which the alarm sound is emitted so that distinction can be made between the running distance alarm and the running time alarm.

Figure 5D:
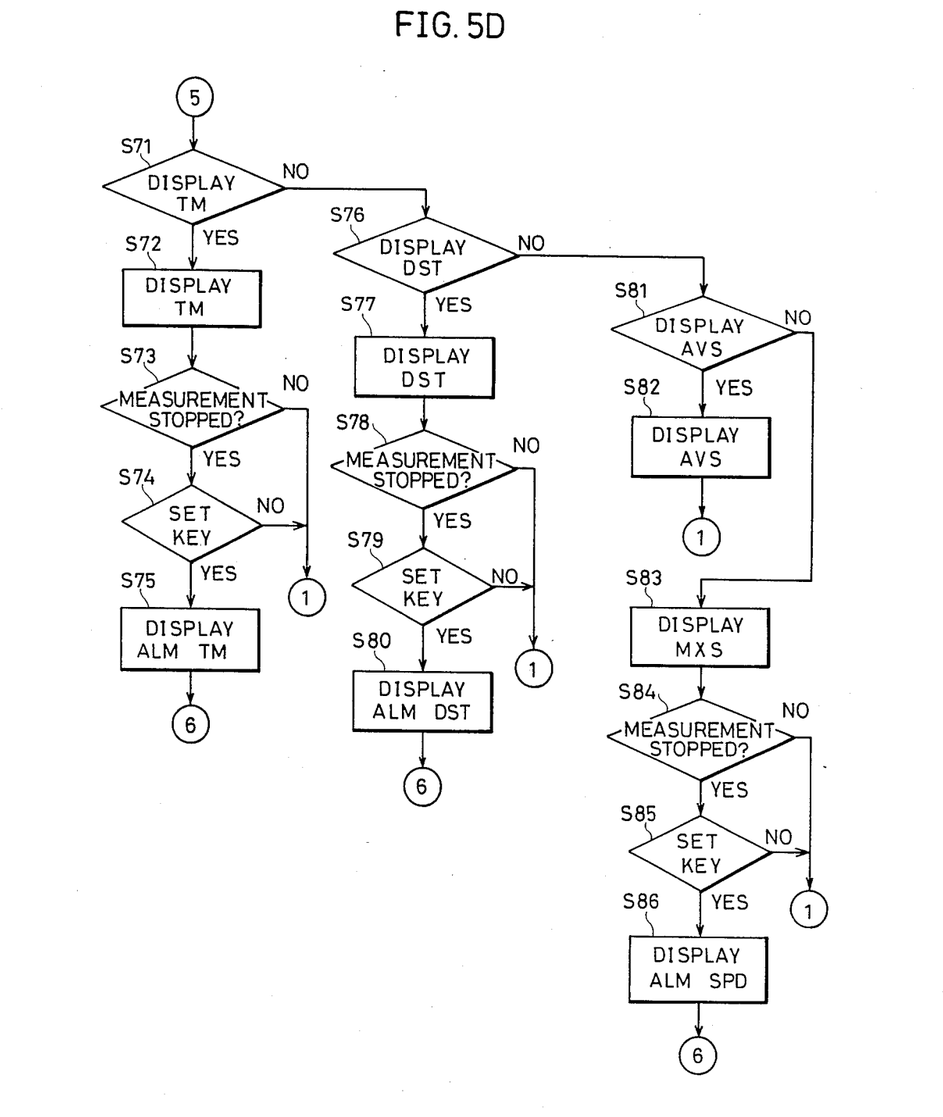

The microcomputer 30 not only performs these sequential operations but also senses all the time whether any one of the keys of the operation key group 16 is pressed (in step S50). If it is determined that the measurement key 21 is pressed, permutation is made between the control operation for stop of measurement and the control operation for measurement (in step S52). As a result, if measurement is being made the measurement is stopped.

If the microcomputer 30 determines that the reset key 22 is pressed, the microcomputer 30 clears that data of the running time, the running distance and the maximum speed stored in the RAM (in steps S53 and S54).

Whenever it is determined that the alarm key 19 is pressed, permutation is made alternately so that the alarm is set or reset and the alarm mark 28 on the liquid crystal display panel 15 is turned on or off.

In step S57, the microcomputer 30 determines whether the mode key 20 is pressed or not. If it is determined that the mode key 20 is pressed for more than two seconds, the microcomputer 30 changes the display mode of the display panel 15 so that it becomes the clock display mode. At the same time, the microcomputer 30 makes the time mark 29 emit winking light and displays the present time in the lower row 18 of the display panel 15.

If the microcomputer 30 determines that the mode key 20 is pressed and that is is pressed for less than 2 seconds, the display mode is changed successively so that it becomes the total distance display mode, the cadence display mode, the running time display mode, the running distance display mode, the average speed display mode and the maximum speed display mode (in steps S64, S65, S69, S70, S71, S72, S76, S77, S81, S82 and S83).

In the total distance display mode, the running time display mode, the running distance display mode and the maximum speed display mode, if the microcomputer 30 determines that measuring operation is stopped and that the set key 37 is pressed, the tire size, the running alarm time, the running alarm distance and the alarm maximum speed are displayed respectively and by the operation in steps S16 to S24, the respective set data are changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A running data display unit for a bicycle, comprising:
    wheel revolution detecting means located in association with a wheel of a bicycle in a manner in which no load is applied to said wheel, said wheel revolution detecting means providing pulse signal according to the number of revolutions of said wheel;
    running data calculating means coupled to said revolution detecting means, by which running data including the running speed, the running distance, the average speed, and the maximum speed of a bicycle are calculated based on said pulse signal provided from said revolution detecting means;
    running data calculation start and stop selecting means coupled to said running data calculating means for starting or stopping the calculation of running data by said running data calculating means;
    liquid crystal display means coupled to said running data calculating means for selectively displaying the running data calculated by said running data calculating means, a speed unit in association with said running data being displayed in said display means;
    speed unit display winking means coupled to said liquid crystal display means and said start and stop selecting means, by which winking of light in said speed unit display is started in response to the start of measurement selected by said start and stop selecting means and said winking of light in said speed unit display is stopped in response to the stop of measurement selected by said start and stop selecting means; and
    power supply means for applying energy to said running data supply unit.

2. A running data display unit for a bicycle as set forth in claim 1, where said determined data selected by said running data calculation start and stop selecting means is running data other than the running speed.

3. A running data display unit for a bicycle as set forth in claim 2, wherein "km/h" or "mile/h" can be selected as said speed unit displayed by said liquid crystal display means.

4. A running data display unit for a bicycle as set forth in claim 3, wherein said liquid crystal display means comprises at least two data display areas,
    said running speed being displayed at all times in one of said data display areas, and
    any data out of the running data other than said running speed being selectively displayed in the other data display area.

5. A running data display unit for a bicycle as set forth in claim 4, wherein said at least two data display areas are provided horizontally in parallel.

6. A running data display unit for a bicycle as set forth in claim 4, wherein said running data displayed in said data display areas are numeric data, and
    said numeric data are displayed respectively in a digital form in said data display areas.

7. A running data display unit for a bicycle as set forth in claim 1, wherein said liquid crystal display means further includes a pulse mark, and
    said running data calculating means causes winking of light in said pulse mark upon receipt of said pulse signal.

8. A running data display unit for a bicycle as set forth in claim 1, wherein
    said power supply means comprises:
    a constant voltage storage battery which can be charged, and
    charging means coupled to said storage battery, by which energy is generated by photoelectric conversion and is applied to said storage battery.

9. A running data display unit for a bicycle as set forth in claim 1, wherein
    said display unit further comprising:
    pedal revolution detecting means detachable from said running data calculating means, said pedal revolution detecting means being located in association with a pedal of said bicycle in a manner in which not load is applied to said pedal,
    said running data calculating means calculating a cadence as the number of revolutions per minute of said pedal based on the output of said pedal revolution detecting means.

10. A running data display unit for a bicycle as set forth in claim 9, wherein said wheel revolution detecting means and said pedal revolution detecting means are magnet sensors.

* * * * *